United States Patent [19]

Tong

[11] 3,861,638

[45] Jan. 21, 1975

[54] DISPLAY STANDS FOR MODELS

[75] Inventor: Duncan Tong, Hong Kong

[73] Assignee: Playart Ltd., Hong Kong

[22] Filed: May 17, 1973

[21] Appl. No.: 361,209

[30] Foreign Application Priority Data

May 17, 1972 Great Britain.................... 23269/72

[52] U.S. Cl......248/407, 248/165, 248/174, 248/423
[51] Int. Cl.......................................... F16m 11/00
[58] Field of Search .......... 248/407, 423, 291, 299, 248/165, 178, 185, 130, 174, 408, 284, 409, 454, 455, 456, 354 P, 354 S, 42, 276, 460, 465, 442, 441; 46/32, 76 R, 76 A 211/43, 37, 3; D34/15HH

[56] References Cited
UNITED STATES PATENTS

| 358,527 | 3/1887 | Zwoyer et al.................... 248/185 X |
| 1,258,120 | 3/1918 | Kaplan.............................. 248/456 |
| 1,580,344 | 4/1926 | Stillians............................. 248/456 |
| 2,155,699 | 4/1939 | Connors............................ 248/455 |
| 2,508,974 | 5/1950 | Soditch et al...................... 248/291 |
| 2,564,213 | 8/1951 | Redhead.......................... 46/76 R X |
| 2,662,333 | 12/1953 | Bargen.............................. 248/455 |
| 3,140,560 | 7/1964 | Gutierrez........................ 46/76 R X |
| D222,496 | 10/1971 | Sojka............................ D34/15 HH |

FOREIGN PATENTS OR APPLICATIONS 325,983 3/1930 Great Britain..................... 248/185

Primary Examiner—Roy D. Frazier
Assistant Examiner—Rodney H. Bonck
Attorney, Agent, or Firm—Hyman Hurvitz

[57] ABSTRACT

A display stand for models comprising either two, or three plane members which can be interlocked in approximately mutually perpendicular positions so that the stand can rest on one edge of each of two of the members. One of the members can be fixed in a number of alternative positions in the same plane, and carries a mounting for a model so that the attitude of the model may be set as desired.

3 Claims, 5 Drawing Figures

DISPLAY STANDS FOR MODELS

This invention relates to display stands for models such as airplanes.

Display stands for model aircraft usually comprise a plastic base and an upstanding portion which supports the aircraft, the two parts being either integrally moulded, or cemented together.

A display stand for models according to the invention comprises at least two interlocking members one of which is adapted to receive a model to be displayed, the members being adapted to be interlocked in a number of different relative positions so that when the assembled stand is resting on a surface, a model mounted on the said first member can be set at different attitudes.

In one embodiment the stand comprises two generally plane plastic members which are adapted to be connected together with their planes intersecting at an angle, so that the stand can rest on a horizontal surface on one edge of each of the members, with the line of intersection inclined to the surface.

In one form of the invention the plane members intersect at right angles and a pivoting connection between them is arranged to be lockable in a number of different positions. The pivoting connection preferably comprises a first stud on the first member which engages with a socket in the second member, and a second stud to engage with one of a line of sockets in the second member so that the joint is pivotable about the first stud, and the angle of the interconnection is defined by the position of the second stud in the line of sockets.

In addition a third interlocking member may be provided which acts to retain the first two members in engagement. This preferably comprises a plane piece of plastics material having a longitudinally extending slot so that it can be slid over the first member of the stand to a position in which its end abuts against the second member. A lug is preferably provided at this end to engage in a suitable socket in the second member.

Alternatively a line of studs may be provided on the second member, and a single corresponding socket on the first member, or sockets may be substituted for the first and second studs of the first member, the connectors on the second member then all being studs.

Some embodiments of the invention will now be described by way of example with reference to the accompanying drawings in which.

Figure 1:
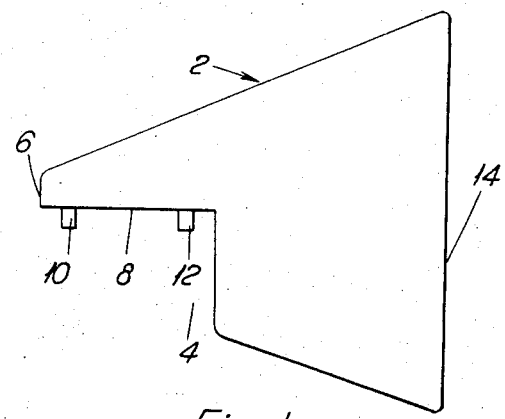
FIG. 1 shows a plan view of the first member of the stand.
Figure 2:
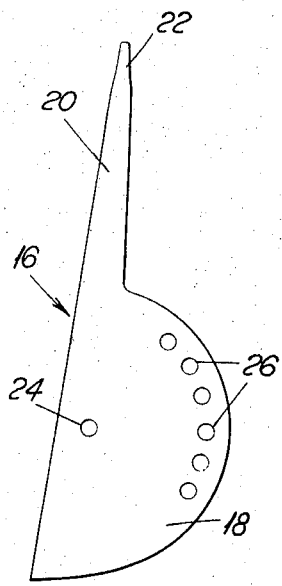
FIG. 2 shows a plan view of the second member of the stand.

Referring to the drawings, the plane member 2 shown in FIG. 1 is approximately triangular in plan, with a right-angled cut-out 4 formed near the apex 6 of the triangle. One edge 8 of the cut-out has a first stud 10 and second stud 12 extending outwardly from it in a direction parallel to the "base" 14 of the triangle. The second member 16 of the stand, shown in FIG. 2, is also plane and is formed with a semi-circular body 18 having an arm 20 extending outwardly from it in the diametral direction. The end 22 of the arm is formed as a peg to engage in a suitable hole in a model.

The semi-circular body carries near its straight edge a socket or hole 24 for engagement with the first stud 10 of the first member. An arcuate line of sockets or holes 26 is spaced around the semi-circular periphery of the part 18 of the member, these, holes all being equi-spaced from the socket 24.

Figure 3:
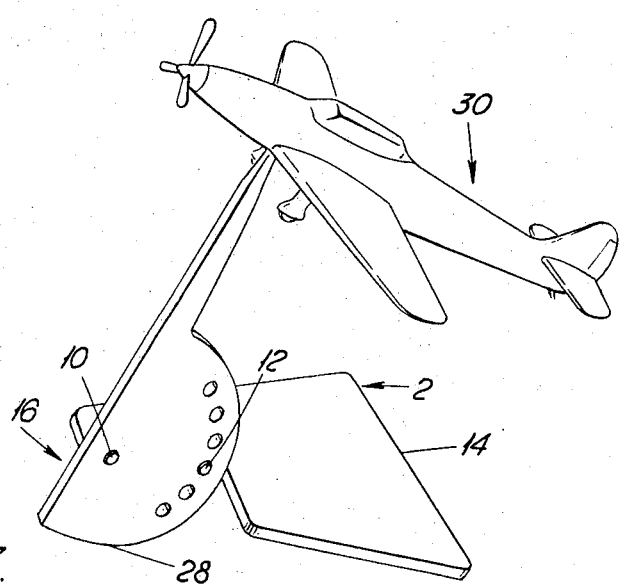
FIG. 3 shows a perspective view of the assembled stand in use.

FIG. 3 shows the stand assembled. The stud 10 is then engaged in the socket 24 and the stud 12 in one of the sockets 26. The stand then rests on a horizontal surface on the edge 14 of the member 2 and on a part 28 of the semi-circular periphery of the member 16. By inserting the stud 12 in a different one of the holes 26 the vertical position of the arm 20, and thus the attitude of a model 30 mounted on the stand, can be adjusted.

Figure 4:
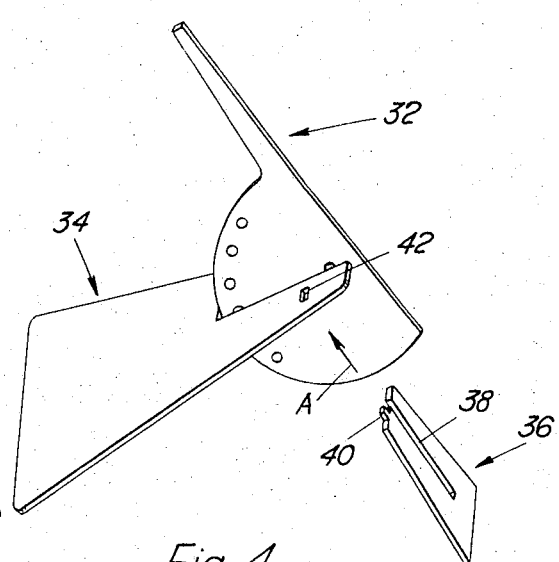
FIG. 4 shows a perspective view of a stand having similar basic compounds to that of FIGS. 1, 2 and 3 and also a third interlocking member; and, FIG. 5 shows the interlocking third member in position.
Figure 5:
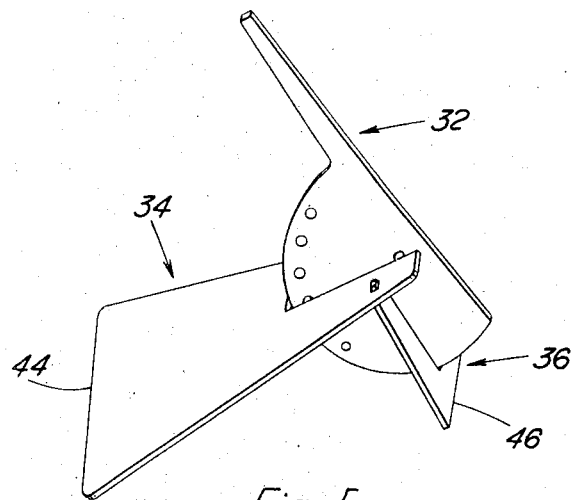

FIG. 4 shows a preferred form of a stand having three interlocking members, in which the two basic members, 32 and 34, respectively, correspond in shape to the members 2 and 16 of the stand of FIG. 3. In addition a generally rectangular locking member 36 is provided which has a longitudinal slot 38 of a suitable width to engage around the body of member 32 so that it can be slid onto the partly assembled stand in the direction shown by the arrow A. A lug 40 on its inner end adjacent the opening of the slot 38 then engages in a socket 42 formed in the member 32, as shown in FIG. 5. The assembled stand can then rest on one edge 44 of the member 34 and on the outer edge 46 of the member 36.

I claim:

1. A display stand comprising a plane first member having a semi-circular part;
    a diametrally extending arm on the first member;
    a peg on the end of the said arm;
    a central socket in said semi-circular part of the said first member;
    and a row of other sockets equi-spaced from the said central socket;
    a plane second member;
    at least one straight edge on said second member;
    a cut-out extending into said second member from one side, one edge of said cut-out being perpendicular to the said straight edge;
    a pair of pegs extending from the said one edge of the cut-out;
    the pegs being spaced at a distance equal to that between the said row of sockets and the said central socket of the first member;
    whereby, the first member and the second member can be interlocked in a plurality of relative positions.

2. A display stand according to claim 1 further comprising:
    a third plane member engageable with the said first and second members;
    a slot extending across the said third member from one edge thereof;
    a lug formed on the said edge of the third member;
    and a socket in the second member to receive the lug;
    whereby, the third member can be engaged around the first member and the lug inserted in the socket of the second member so as to positively interlock the first and second members.

3. A display stand according to claim 2 further comprising:
    at least one straight edge on the third member, perpendicular to the slot in the said member;
    whereby, when the stand is assembled it can rest on a surface on the said straight edges of its second and third members.

* * * * *